United States Patent [19]

Banks

[11] 4,450,686
[45] May 29, 1984

[54] SINGLE WIRE NITINOL ENGINE

[76] Inventor: Ridgway M. Banks, 7411 Park Vista, El Cerrito, Calif. 94530

[21] Appl. No.: 477,258

[22] Filed: Mar. 21, 1983

[51] Int. Cl.³ .............................................. F03G 7/06
[52] U.S. Cl. ..................................................... 60/527
[58] Field of Search ......................... 60/527, 528, 529

[56] References Cited

U.S. PATENT DOCUMENTS

| | | | |
|---|---|---|---|
| 3,913,326 | 10/1975 | Banks | 60/527 |
| 4,086,769 | 5/1978 | Smith | 60/527 |
| 4,257,231 | 3/1981 | Banks | 60/527 |
| 4,325,217 | 4/1982 | Golestaneh | 60/527 |

Primary Examiner—Allen M. Ostrager
Attorney, Agent, or Firm—Bruce & McCoy

[57] ABSTRACT

A simple single wire nitinol engine including a pair of levers, one of which reciprocates with respect to the other and is connected to a crank shaft by a connecting rod to transmit rotational energy from the reciprocating motion of the lever. A spring wound single nitinol wire is connected to the ends of the levers and a means is provided for immersing the wire alternately in hot and cold temperature baths.

6 Claims, 5 Drawing Figures

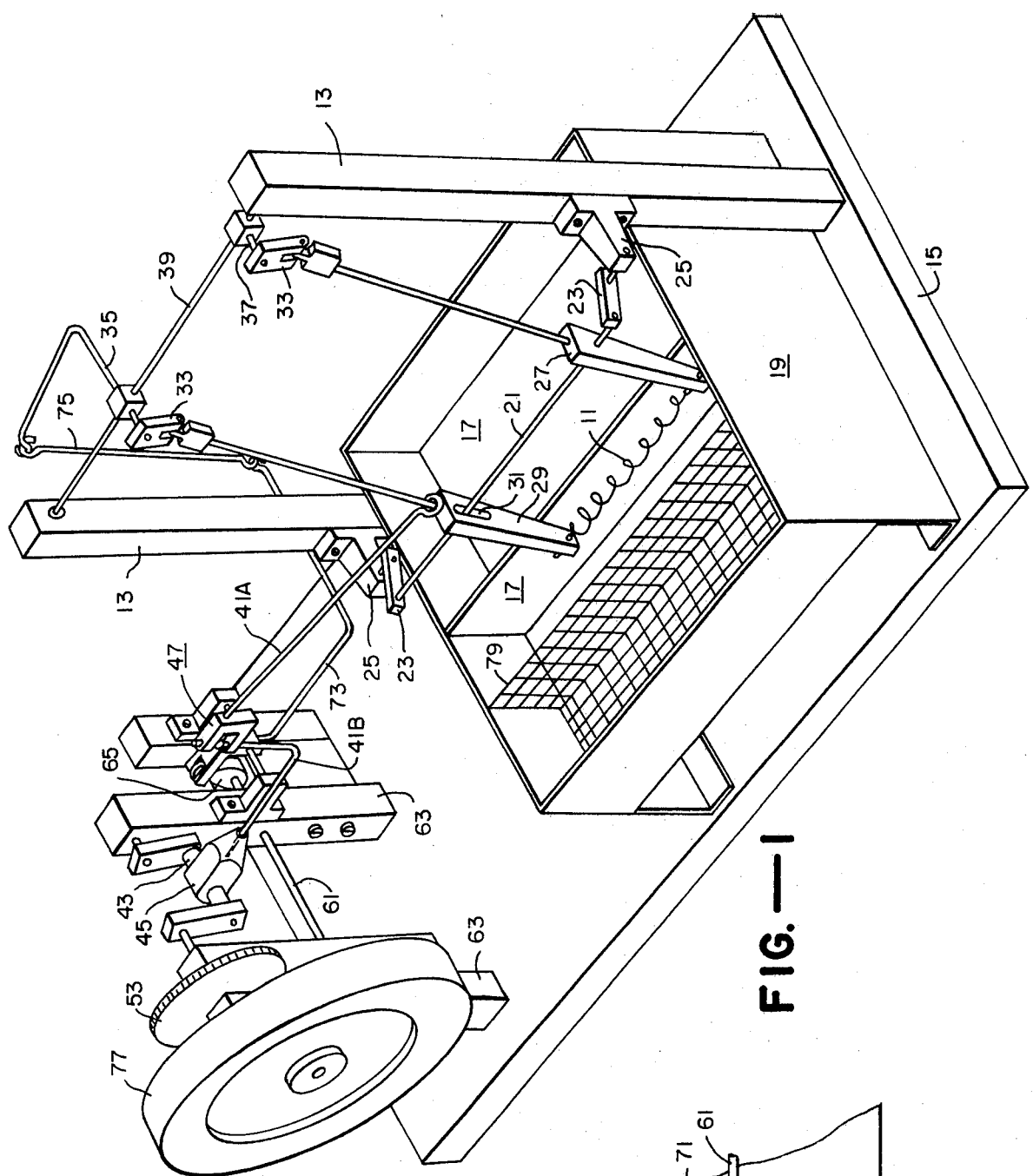
FIG.—1
FIG.—4

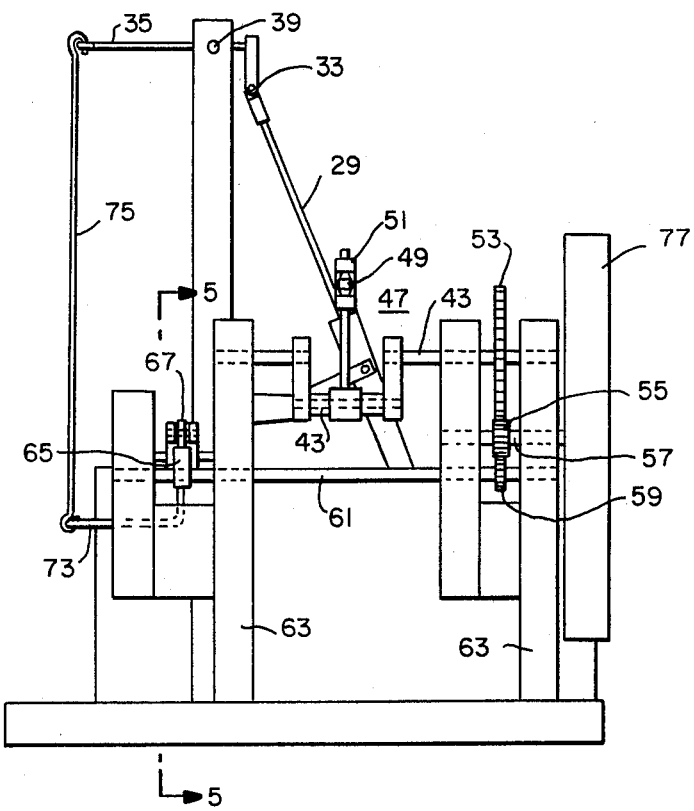
FIG.—2
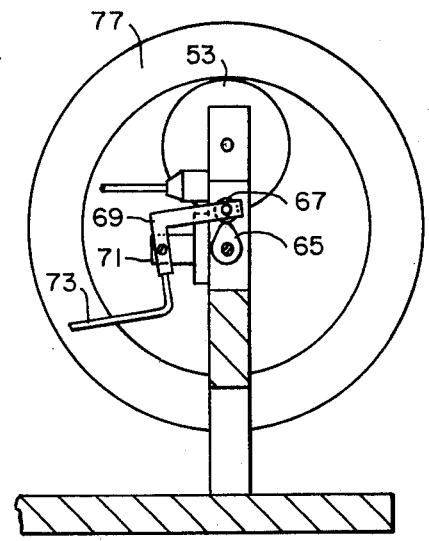
FIG.—5
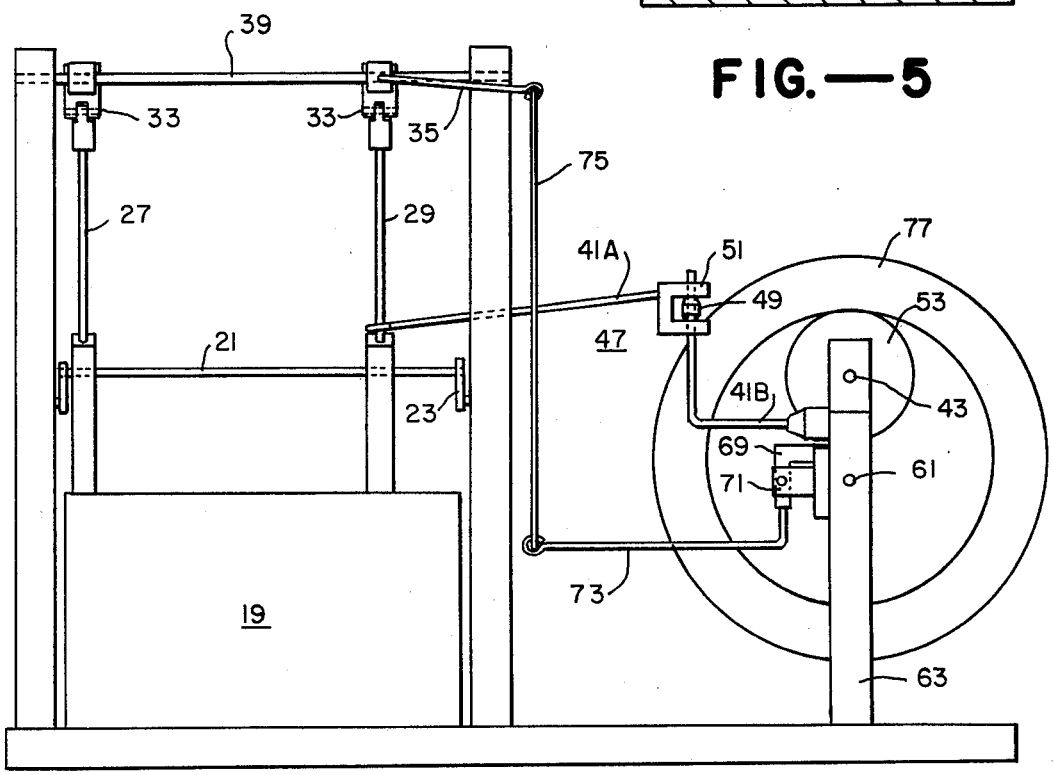
FIG.—3

SINGLE WIRE NITINOL ENGINE

BACKGROUND OF THE INVENTION

1. Field of the Invention

The present invention relates to heat engines and more particularly to a single wire nitinol powered heat engine.

2. Description of the Prior Art

The inventor of the present invention is also the inventor of the Banks nitinol heat engines, U.S. Pat. No. 3,913,326 issued Oct. 21, 1975 and U.S. Pat. No. 4,257,231 issued Mar. 24, 1981. The "Background of the Invention" section of U.S. Pat. No. 3,913,326 sets forth the status of the prior art at the time the application for that patent was filed in April of 1974. The "Summary of the Invention" section of that patent describes the working material, nitinol, as a thermally responsive memory material. It is the same material which is used to power the present invention. The material has also been called a shape memory alloy.

The "Background of the Invention" section of U.S. Pat. No. 4,257,231 sets forth the status of the prior art which developed between the time of the filing of the earlier patent in 1974 and the filing of the latter patent in September 1979. The "Background of the Invention" and the "Summary of the Invention" sections of U.S. Pat. No. 4,257,231 set forth the problems that existed in the prior art at the time U.S. Pat. No. 4,257,231 application was filed.

The present invention is an attempt to simplify the basic solutions to the problems which were achieved by U.S. Pat. No. 4,257,231 into a single wire nitinol engine which can be used for demonstration purposes and is of a much lighter and simpler construction than has heretofore been known for providing an operable nitinol engine.

SUMMARY OF THE INVENTION

The present invention is a single wire nitinol engine which comprises a pair of levers, one of which is fixed against movement with respect to the other. The other lever is formed to have one end thereof reciprocate in straight line motion toward and away from the other fixed lever. A nitinol wire formed in the configuration of a spring is secured between the ends of the two levers; between the end of the reciprocatable lever and the respective end of the fixed lever.

A means is provided which is engaged with the levers to reciprocate the ends of the levers to which the nitinol wire is attached between a pair of hot and cold temperature baths. A connecting rod is interconnected between the reciprocating lever and a crank shaft whereby the reciprocating motion of the lever rotates the crank shaft. This simple construction permits the energetic shape change which occurs in the nitinol wire to be absorbed by the pair of levers and translated into the rotary motion of the crank shaft and utilized for providing a small amount of dynamic energy.

OBJECTS OF THE INVENTION

It is therefore an important object of the present invention to provide a single wire nitinol engine.

It is also an object of the present invention to provide a nitinol engine of a very simple design having a direct power take off.

It is another object of the present invention to provide a single wire nitinol engine which is completely adjustable to compensate for the changes which occur in the working performance of the wire as it trains to repeat the cycle more efficiently from operation over a period of time.

And it is a further object of the present invention to provide a demonstration nitinol engine which can be operated with hot and cold temperature baths which do not need to be supplied with recirculating fluids.

Other objects of the present invention will become apparent when the description of the preferred embodiment is considered in conjunction with the accompanying drawings.

DESCRIPTION OF THE DRAWINGS

FIG. 1 is a perspective view of a preferred embodiment of the present invention;

FIG. 2 is an end elevation thereof;

FIG. 3 is a side elevation thereof;

FIG. 4 is a partial top plan view of FIG. 5; and

FIG. 5 is a partial sectional view taken along line 5—5 of FIG. 2.

DESCRIPTION OF THE PREFERRED EMBODIMENT

The present invention is a heat engine utilizing thermally responsive elements of a shape memory material. More specifically, it is a simple single wire nitinol engine using the basic principle of my prior U.S. Pat. No. 4,257,231 in a highly modified and simplified form.

The thermally responsive nitinol wire element 11 which powers the invention is best viewed in FIG. 1 and has the memory property characteristic of shortening and lengthening when thermally cycled. The wire is preworked in the cold state so that it lengthens when cooled below its phase change temperature and shortens when heated above the phase change temperature.

The preferred embodiment of the present invention is best viewed in FIG. 1 and includes a pair of vertical support stands 13 which are secured to a flat horizontal base 15. The stands support a pair of elongated fluid containers 17 which are formed to hold hot and cold temperature baths. In the preferred embodiment, the fluid containers are elevated and secured to the base 15 so they do not move when the machine operates thereby preventing a possible mechanical interference with the operating mechanism of the machine. For ease in emptying the containers after use, a pair of removeable trays 19 are placed in the support stand to hold the hot and cold fluids so that the fluids can be easily extracted from the machine by removing the trays.

A movable shaft 21 which is best viewed in FIGS. 1 and 3 is mounted on the support stands 13 at the ends of a pair of cranks 23 whereby it moves in an arc alternately from a position over one of the fluid containers 17 to a position over the other. The cranks 23 supporting the shaft 21 are journalled in a pair of projecting cantilevered supports 25 from the two support stands. The shaft 21 is disposed with the axis of its arc of rotation proximate the center line between the two fluid containers at a position thereabove.

The engine is provided with a pair of levers 27,29 which is best viewed in FIGS. 1 and 3. One of the levers 27 is fixed against movement with respect to the other and the other 29 is formed to have one end thereof reciprocate in a straight line motion toward and away from the respective end of the fixed lever 27. The levers are journalled on the movable shaft 21 with the fixed lever 27 being disposed between a pair of movable stops (such as setscrew collars-not shown) so that it can be adjusted to any position along the shaft while the journal connection permits it to partially rotate with respect to the shaft. The movable lever 29 which reciprocates with respect to the fixed lever is journalled to the movable shaft with a relatively large opening e.g., an elongated slot 31, which simply captures the shaft 21 to cause the lever to move with the shaft and to also permit the lever to slide along the shaft without binding as well as to partially rotate around it. The elongated slot is formed with beveled edges so that it does not have an edge which would engage or bind with the shaft. The upper ends of the levers 27,29 are hinged 33 to a pair of rocker arms 35,37 mounted on a shaft 39 journalled between the support stands 13 at the upper ends thereof.

The nitinol wire element 11 which is best viewed in FIG. 1 is formed in the configuration of a spring and secured between the ends of the reciprocable lever 29 and the respective end of the fixed lever 27. In the preferred embodiment, these connections are at the lower ends of the two levers.

A means is engaged with the levers to also reciprocate the ends thereof, to which the nitinol wire is attached, between the hot and cold temperature baths. This means includes the movable shaft 21 which reciprocates the two ends of the levers from one fluid container to the other by moving the shaft in an arc such that the wire is moved up and out of one fluid container 17 and down into the other and then back again which is best viewed in FIGS. 1 and 3. The upward movement at the levers is effected by the rocker arms 35,37 located at the top of the device and which are secured to the rocker arm shaft 39. The rocker arm shaft is journalled to partially rotate or oscillate in the two upright supports 13, and the two rocker arms are secured to the shaft so that when the first rocker arm 35 which is connected to the reciprocatable lever 29, is actuated, the second rocker arm 37 which is attached to the fixed lever 27 also operates in unison with the first rocker arm. The motion of the rocker arms imports a second reciprocating motion to the levers 27,29 which is different from the first reciprocating motion, that is, the back and forth motion of the reciprocatable lever with respect to the fixed lever. The second reciprocating motion of the levers is also a double movement which causes the wire 11 attached to the ends of the levers to move from one tank to the other with both an up and down motion into and out of each of the fluid containers 17, as well as a back and forth lateral translational (horizontal component of) motion of the wire between the fluid containers; from one to the other.

A connecting rod 41 which is best viewed in FIGS. 1 and 3 is interconnected between the reciprocating lever 29 and a crank shaft 43 whereby the reciprocating motion of the lever rotates the crank shaft. In the preferred embodiment, the connecting rod is articulated by being comprised of two elements both of which are rigid. The first element 41A is interconnected with the reciprocating lever by means of a simple loop in the end of the connecting rod which loosely surrounds and captures the lower end of the lever proximate to the movable shaft in a captured relation. The second element 41B of the connecting rod is secured to the crank shaft journal with a rotatable connection 45 so that it drives the crank shaft 43 when the connecting rod 41 is reciprocated by the motion of the lever 29. The two elements of the connecting rod are interconnected with a journal connection 47 which articulates the connecting rod so that the reciprocating and lateral translational motion of the reciprocating lever can be absorbed, accommodated, and transmitted by the articulation of the connecting rod. In the preferred embodiment, the articulation joint 47 is provided with a removable stop 49 on what constitutes a journal shaft portion of the second element 41B of the connecting rod which is engaged with the crankshaft 43. The stop is disposed between the two journal connections of the U-shaped terminal fitting 51 on the end of the first element 41A of the connecting rod which is secured to the reciprocatable lever 29.

The means which is engaged with the pair of levers 27,29 to reciprocate the nitinol wire 11 between the hot and cold baths includes a timing mechanism engaged with the reciprocatable lever 29 to cause the nitinol wire to be lifted from each of the baths after it has completed its phase transformation in the respective bath. The timing mechanism which is best viewed in FIGS. 2, 4 and 5 and includes a gear train which is driven by the crank shaft 43. A first spur gear 53 secured to the crank shaft 43 drives an intermediate idler gear 55 which in the preferred embodiment is also engaged to a shaft 57 which supports and drives a flywheel. The idler gear in turn drives a second spur gear 59 which is one-half the size of the first spur gear 53 and is secured to a cam shaft 61 which turns at twice the speed of the crank shaft 43.

A cam shaft 61 and the gear train are supported in a second set of vertical support stands 63 mounted on said base 15. The cam shaft drives a single lobe cam 65 which actuates a cam follower. The cam follower includes a roller 67 which rides on the cam surface and a rocker arm 69 journalled in a pair of supports 71 mounted on the second set of vertical supports 63 secured to the base. Obviously a double lobe cam driven by a shaft turning at the same speed as the crankshaft would achieve the same result.

A mechanical linkage is engaged with the cam follower to actuate the pair of rocker arms which lift the levers on the movable shaft out of each of the baths after the nitinol wire has changed phase. The mechanical linkage is best viewed in FIGS. 2 and 3 and includes a pushrod 73 which extends from the cam follower rocker arm 69 and is engaged with a connecting rod 75 which interconnects the push rod 73 and one of the pair of rocker arms 35 so that as the push rod is actuated by the cam, the pair of rocker arms 35,37 are actuated to lift the pair of levers 27,29.

A means is provided which is engaged with the crank shaft for utilizing the energy developed by the nitinol wire. In the preferred embodiment shown in FIGS. 1, 2 and 3 it consists of a flywheel 77 but it could of course include a rotary motion absorption connection and power takeoff means.

All of the parts of the preferred embodiment of the engine can be put together with removable or adjustable connections so that the engine can be adjusted in its timing. As the nitinol wire trains from repeated phase change cycling between the hot and cold baths, it tends to change phase in a faster and more orderly manner whereby the engine operates faster and more powerfully, and it is necessary to advance the timing slightly for the faster cycle. The cam must be adjusted, as well as some of the throws on the rocker arms, and the levers adjusted along the movable shaft and the pairs of rocker arms adjusted along the rocker arm shaft. This can be done by tril and error to achieve the highest rate of rotational motion of the crankshaft for a given load.

Operation of the nitinol engine is quite easy to effect. Ice water is put into the bath employing a Weir fence 79 which holds ice cubes from floating into the operable area where the nitinol wire is immersed in the tank which could possibly cause a mechanical interference with the operation of the machine. Hot tap water is put in the other bath, and then the engine is started by hand. To start it, the wire needs to shorten which occurs when it is put into hot water from the cold. This causes the reciprocatable lever 29 to move toward the fixed lever 27 and pulls on the connecting rod 41 which in turn moves the crank shaft 43 journal setting the flywheel 79 in motion. During operation, the gear train actuates the cam 65 and follower mechanism to actuate the connecting rod 75 between the push rod 73 and the pair of rocker arms 35,37. The pair of rocker arms partially rotate up and down to lift and lower the reciprocating levers 27,29 into and out of the hot and cold baths. The upward motion of the levers automatically carries the movable shaft 21 and the levers on through the top of the stroke to allow the levers to move downward over each of the baths alternately and to immerse the spring 11 into the baths.

It has been found that as the wire trains from repeated phase change cycling between the hot and cold baths such that the spring actually exerts a not insignificant separating force on the reciprocatable lever when it elongates in the cold bath which force additionally powers and helps actuate the mechanism. If the spring did not elongate by itself and spread the levers, the connecting rod 41 driven by the flywheel would pull the reciprocal lever away from the fixed lever to elongate the spring so that when it is put into the hot bath it would be poised to contract to power the engine.

Thus, the present invention is a very simple single wire nitinol engine, and it will be seen from the foregoing description that all of the objects and advantages claimed therefore are achieved. While the apparatus of the present invention has been described in considerable detail, many modifications and improvements should be obvious to one skilled in the art. Thus, it is not to be limited to the details as set forth herein except as may be necessitated by the appended claims.

I claim:

1. A single wire nitinol engine comprising
   a pair of levers, one being fixed against movement with respect to the other, the other being formed to have one end thereof reciprocate in straight line motion toward and away from said fixed lever,
   a nitinol wire formed in the configuration of a spring secured between the end of the reciprocatable lever and the end of the fixed lever,
   means engaged with said levers to also reciprocate the ends thereof to which the nitinol wire is attached between hot and cold temperature baths,
   a connecting rod interconnected between said reciprocatable lever and a crank shaft whereby the reciprocating motion of said lever rotates said crank shaft.

2. The single wire nitinol engine of claim 1 wherein the means for reciprocating the nitinol wire between the hot and cold baths includes a timing mechanism engaged with said crank shaft to cause the nitinol wire to be lifted from each of the baths after it has completed its phase transformation in the respective bath.

3. The single wire nitinol engine of claim 2 wherein the timing mechanism includes a cam driven at twice the speed of said crank shaft and a mechanical linkage operated by said cam which actuates a rocker arm assembly connected to said levers which lifts the pair of levers simultaneously from said baths.

4. The single wire nitinol engine of claim 1 wherein said levers are journalled on a movable shaft which causes the nitinol wire at the ends of the levers to be alternatively immersed in the hot and cold temperature baths.

5. The single wire nitinol engine of claim 4 wherein said movable shaft is mounted at the end of at least one crank which moves the shaft in an arc alternately from a position over one of the temperature baths to a position over the other.

6. A single wire nitinol engine comprising
   a pair of levers, one being fixed against movement with respect to the other, and the other being formed to have one end thereof reciprocate in straight line motion toward and away from said fixed lever, said levers being journalled on a movable shaft which travels longitudinally in the plane of an arc,
   a nitinol wire formed in the configuration of a spring secured between the end of the reciprocatable lever and the end of the fixed lever,
   a connecting rod interconnected between said reciprocating lever and a crank shaft whereby the reciprocating motion of said lever rotates siad crank shaft,
   means engaged with said levers to also reciprocate the ends thereof to which the nitinol wire is attached between hot and cold temperature baths, said means including
   a movable shaft having said pair of levers journalled thereon, said movable shaft being mounted at the ends of a pair of cranks whereby it moves longitudinally in an arc alternately from a position over one of the temperature baths to a position over the other to alternately immerse the nitinol wire at the ends of the levers in the hot and cold temperature baths,
   a rocker arm assembly connected to said levers which lifts the pair of levers simultaneously from said baths after the nitinol wire has completed its phase transformation in the respective bath, and
   a timing mechanism engaged with the reciprocatable lever which causes the rocker arm assembly to lift the nitinol wire from each of said baths after it has completed its phase transformation, said timing mechanism including a cam driven at twice the speed of said crank shaft and a mechanical linkage operated by said cam which actuates said rocker arm assembly, and
   means engaged with said crank shaft absorbing the energy developed by said wire.

* * * * *